May 3, 1932.  E. E. MOTTER  1,856,397
PARACHUTE AND INSTALLATION THEREOF
Filed Aug. 11, 1930  5 Sheets-Sheet 1
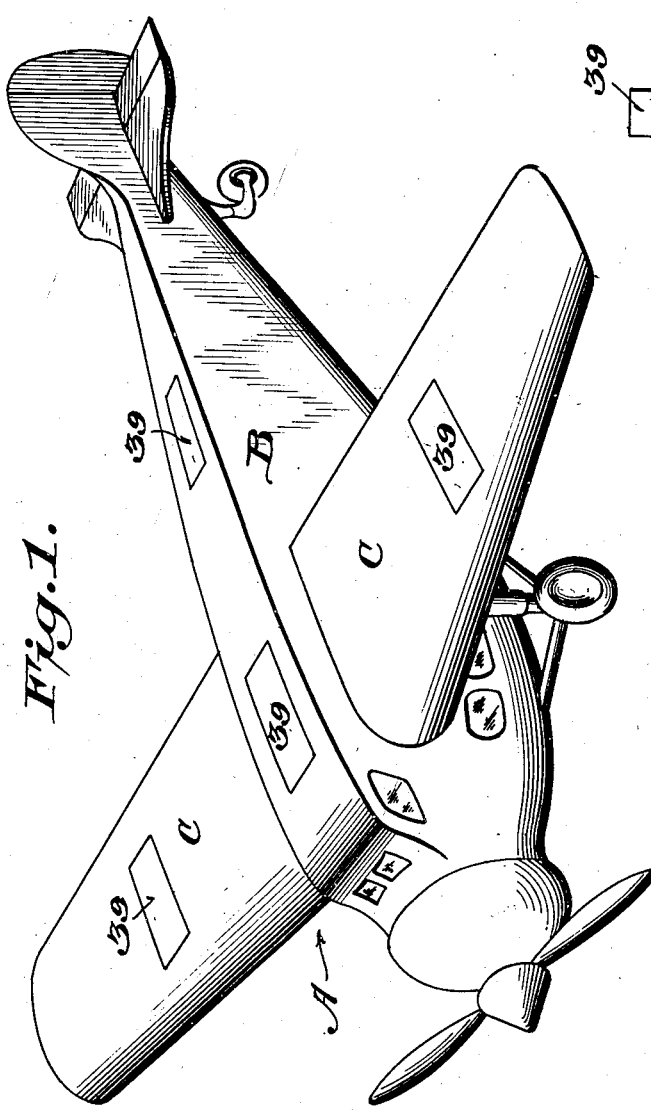
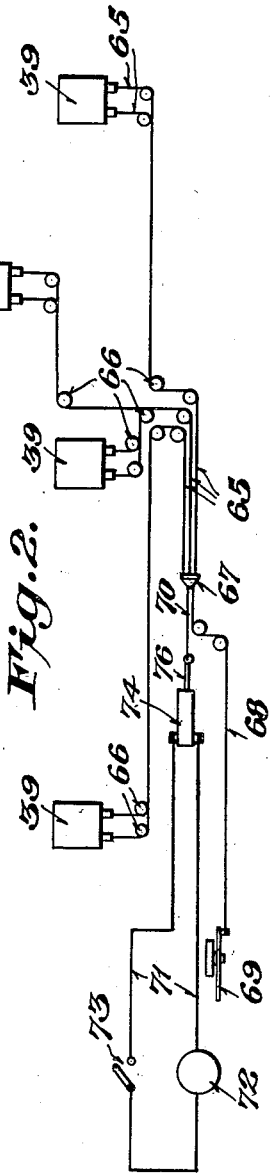
INVENTOR
Elmer E. Motter,
BY
Royal E. Burnham
ATTORNEY

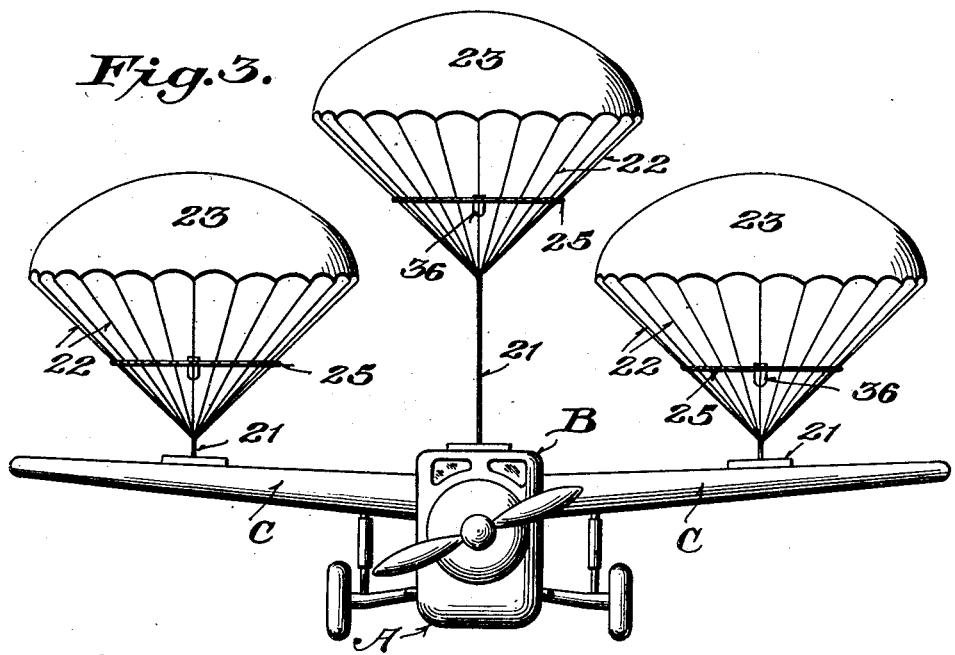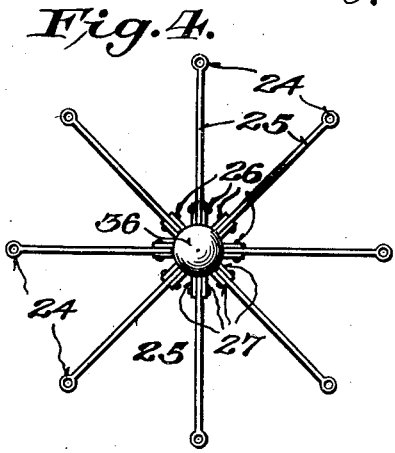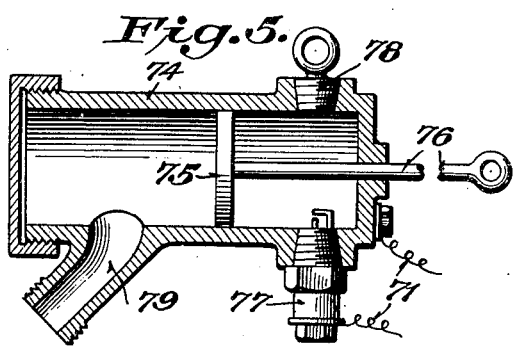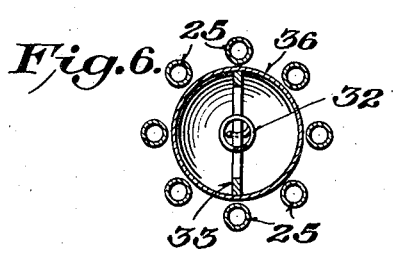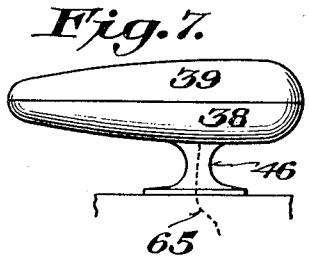

May 3, 1932. E. E. MOTTER 1,856,397
PARACHUTE AND INSTALLATION THEREOF
Filed Aug. 11, 1930 5 Sheets-Sheet 3

INVENTOR
Elmer E. Motter,
BY
ATTORNEY

May 3, 1932. E. E. MOTTER 1,856,397
PARACHUTE AND INSTALLATION THEREOF
Filed Aug. 11, 1930 5 Sheets-Sheet 4
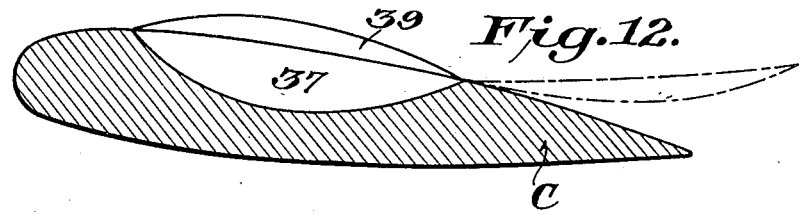
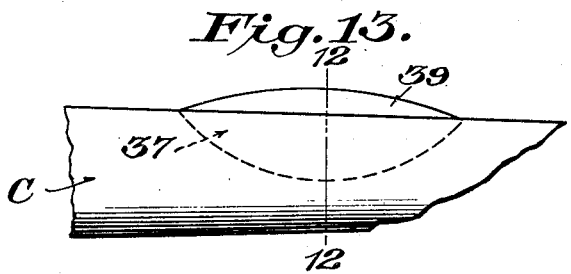
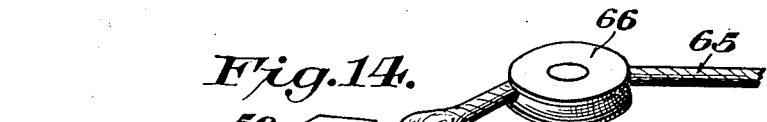
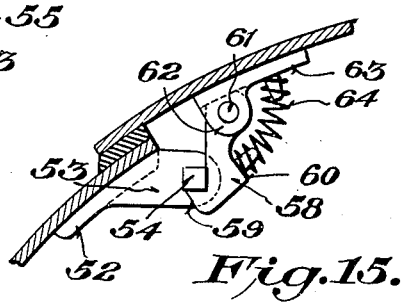
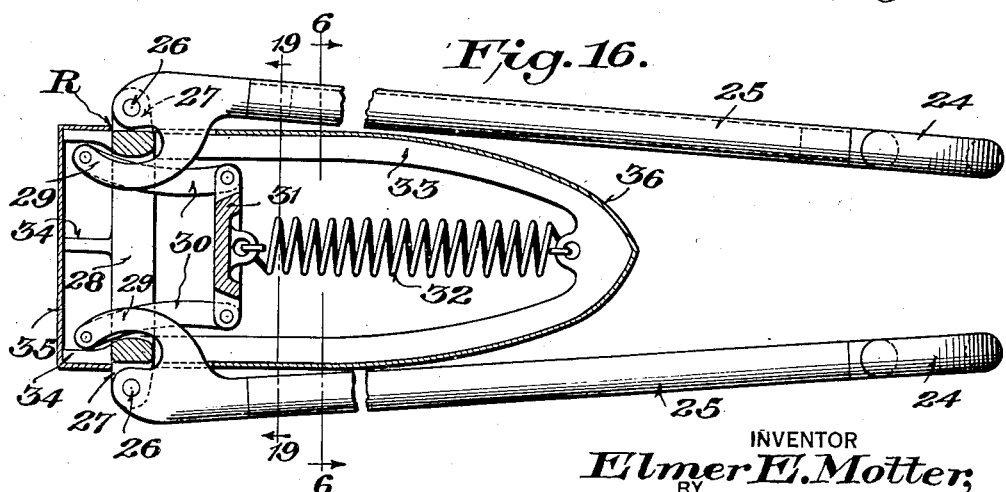
INVENTOR
Elmer E. Motter,
BY
Royal E. Burnham,
ATTORNEY May 3, 1932.  E. E. MOTTER  1,856,397
PARACHUTE AND INSTALLATION THEREOF
Filed Aug. 11, 1930  5 Sheets-Sheet 5
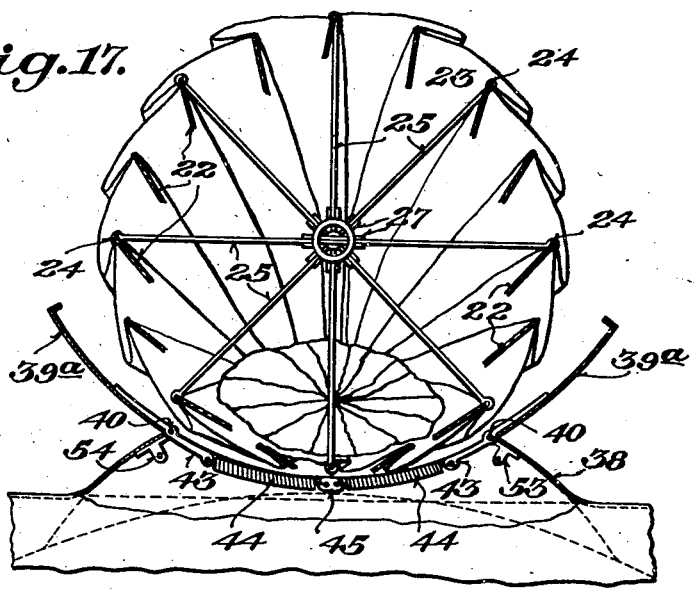
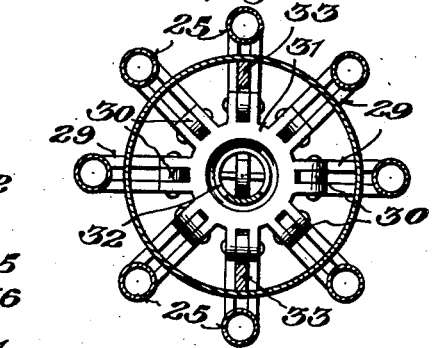
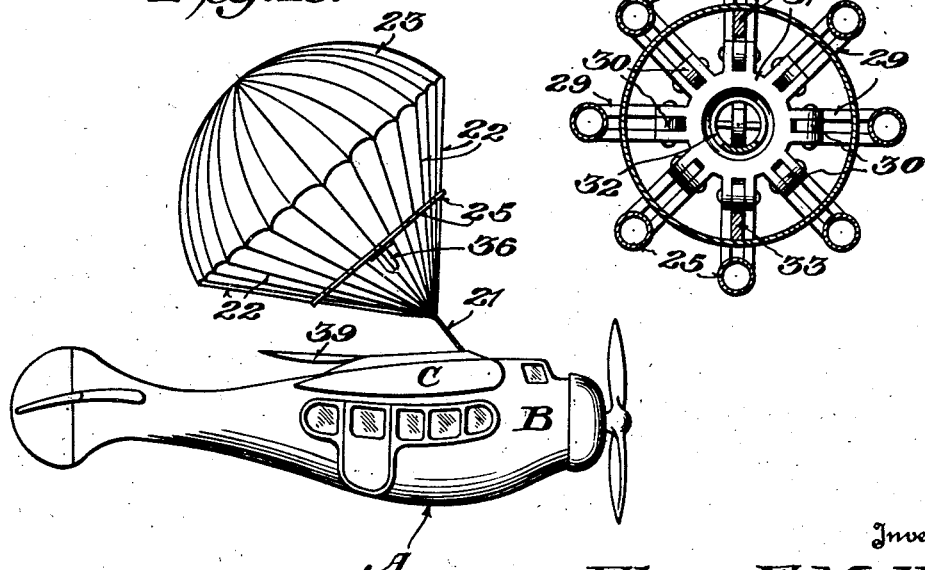
Inventor
Elmer E. Motter,
By Royal E. Burnham,
Attorney Patented May 3, 1932

1,856,397

UNITED STATES PATENT OFFICE

ELMER EIDEMILLER MOTTER, OF PLEASANT RIDGE, MICHIGAN

PARACHUTE AND INSTALLATION THEREOF

Application filed August 11, 1930. Serial No. 474,560.

This invention relates to parachutes so associated with an aircraft that they easily and quickly may be released, in an emergency, from folded and stowed condition, and thus readily permitted to assume open and sustaining condition, so that they will retard the fall of the aircraft and result in its reaching the ground without injury to itself and occupants.

It is an object of the invention to provide an emergency safety system, whereby the operator of an aircraft instantly can release one or more parachutes from folded into effective open condition, so that an aircraft that is disabled or out of control may descend with its occupants to a safe landing.

Another object of the invention is to provide a parachute that inherently will open, or assist in opening, the cover or covering within which it is confined in folded condition.

Further, it is an object of the invention to provide a parachute that includes means whereby parachute, when released, initially is unfolded partially, so that there is not too great and sudden resistance to the air, and then permitted gradually, under retarding influence, to extend to fully open condition; and means are provided also to insure the gradual pay-out of the parachute load-rope from an aircraft.

The parachute provided by the invention, not only is susceptible of being installed and housed within the fuselage, planes, and other suitable parts of airplanes and other aircraft already built, but it also may be associated easily with aircraft while under construction.

Moreover, the invention contemplates the association of any desired or required number of parachutes, within structural and space limitations, with an aircraft, and it provides means, under control of the pilot or other occupant, for the simultaneous release of the parachutes.

Although the parachute provided by the invention is intended more particularly for association with an aircraft, it is adaptable also to be carried collapsed on the person of an aircraft occupant.

When considered with the description herein, the characteristics of the invention are apparent from the accompanying drawings, forming part hereof, wherein adaptations of the invention, as applied to an airplane, are disclosed, for purposes of illustration.

Although the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Fig. 1 is a view of an airplane having compartments within which parachutes are stowed;

Fig. 2 is a diagrammatic view of the parachuter-release system;

Fig. 3 is a front elevation of an airplane with released parachutes attached thereto;

Fig. 4 is an elevation of the parachute-opener;

Fig. 5 is a section of an actuator of the release system;

Fig. 6 is a section, on a smaller scale, on the line 6—6, Fig. 16;

Fig. 7 is a side elevation of a parachute-container adapted to be secured to the outside of an aircraft;

Fig. 12 is a section, on the line 12—12, Fig. 13, of an airplane-wing having built-in parachute housing.

Fig. 13 is a fragmentary elevation of a wing such as shown by Fig. 12;

Fig. 14 is a view of the housing-cover latch and associated parts;

Fig. 15 is a fragmentary section, showing the latch in elevation;

Fig. 16 is a view, partly in section, of a folded parachute-opener;

Fig. 17 is an elevation, partly in section, of a parachute partly open and about to leave its housing;

Fig. 18 is a side elevation of an airplane having a parachute attached thereto;

Fig. 19 is a section on the line 19—19, Fig. 16.

The parachute

Figure 8:
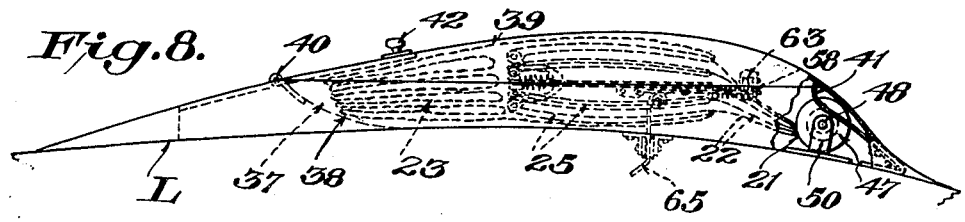
Fig. 8 is a side view of a parachute-housing mounted on the top surface of an airplane-fuselage, certain parts being broken away, and the parachute being shown by dotted lines in folded condition.

The parachute is attached to an aircraft, or to a person or other object, by a load-rope 21, to which are attached cords 22 at their point of convergence at one end, the other ends of the cords being attached to the edge of an envelope 23 of suitable foldable fabric and as elements thereof.

The cords extend through eyes 24 in free end portions of light tubular arms 25 of an opening device, they being freely slidable on the cords. The arms are mounted swingably at the other ends on pivots 26 carried by lugs 27 extending outwardly from a central annular member 28. Each of the arms has a lever portion 29 shaped to extend inside of the member 28 and of the pivotal points. Links 30 are connected pivotally to the ends of the levers and to a draw member 31. A contacting spring 32, which gives to the device inherent tendency and ability to open, is connected at one end to the draw member and at the other end to a substantially U-shaped member or yoke 33, the legs of which extend from, and preferably are formed integrally with, the annular member 28.

In order to minimize liability of entanglement of the parachute opener and rigging with the opening elements of the opener, the annular member 28 is provided on the side opposite to the draw member with annularly-disposed lugs 34, over which tightly is fitted a cap 35, which constitutes a housing for the ends of the levers 29 when the opener is collapsed, and a shield 36 is fitted tightly over the yoke 33 and houses it and the contained draw member and spring. The cap and shield advantageously may be made of light spun metal.

Parachute installation

The parachute is adapted particularly for installation folded or collapsed in a compartment on or in an aircraft, as seen, for example, in the case of an airplane A of conventional form, having a fuselage B and wings C, as illustrated by the drawings.

Figure 9:
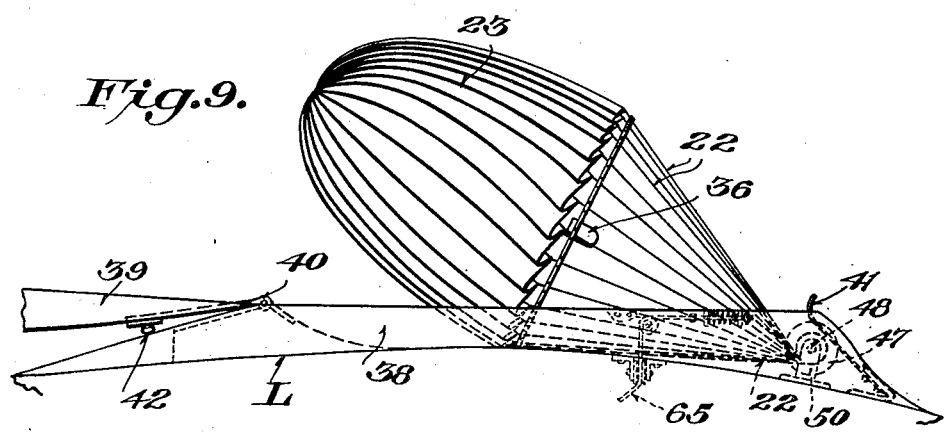
Fig. 9 is a view similar to Fig. 8, with the cover open and the parachute in the process of assuming its effective condition.
Figure 10:
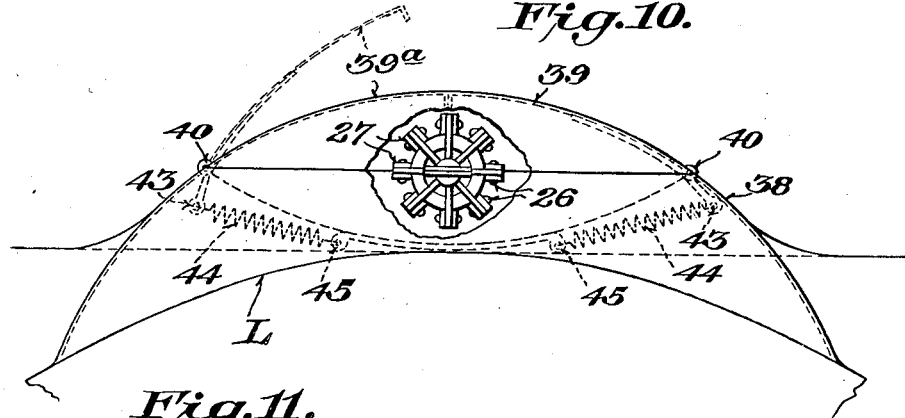
Fig. 10 is an elevation, with parts broken away, of a type of parachute housing adapted to certain types of aircraft.

In the case of airplanes already built, the parachute-compartment 37 and its housing-walls 38 may be placed on top of the fuselage and/or wings, as seen in Figs. 8, 9, and 10, in each of which the line L indicates the contour of the upper surface of the element to which they are applied, and the cover 39 and the housing-walls are of stream-line contour to offer a minimum of resistance to the air; the compartment proper may be wholly within a wing part when it is impracticable to accommodate the parachute wholly within the wing, with a cover bulging thereabove and thus affording additional interior space, as seen in Figs. 12 and 13; or the compartments may be wholly within the fuselage and wings with flush covers, as seen in Fig. 1.

The compartment-cover may be mounted on a hinge 40 at the rear, so that it may open by swinging from front to rear, a leaf-spring 41 may be located in the compartment to give initial opening impulse to the cover, and the cover may have a buffer 42 to contact, when the cover is open, with the upper surface of the structure, as seen in Figs. 8 and 9.

With some installations, and to meet factors encountered in types of aircraft in their construction and operation, it is advisable to make the cover of two parts 39—a, which are hinged at the sides and swingable laterally in opening, as seen in Figs. 10 and 17. Each of these cover parts has fixed rigidly thereto an inwardly-extending arm 43, to the free end of which is attached one end of a contracting coil-spring 44, which is connected at the other end with a fixed part 45, the springs operating to open the cover parts when they are unlocked.

The parachute also may be inclosed in a compartment in a stream-line-shaped housing and cover mounted on a pedestal 46 attached to an aircraft, as seen in Fig. 7.

Figure 11:
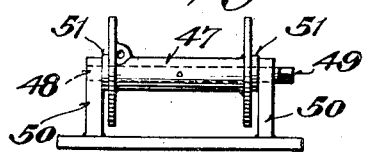
Fig. 11 is an elevation of the parachute-rope drum.

The parachute in collapsed condition is housed within the compartment, as shown by dotted lines in Fig. 8. The load-rope 21 is attached to and is windable on and from a drum 47, which is fixed to a shaft 48, having a squared extending end 49 to take a crank or other turning member, and rotatable in standards 50. The drum may be provided with any suitable braking means to retard the pay-out of the load-rope; for example, felt or other washers 51 having a tendency to expand interposed between the standards 50 and the heads of the drum (Fig. 11).

Locking and releasing system

When the compartment cover consists of a single part, it may be locked closed by latches, such as shown by Figs. 14 and 15, one of which is located on each side near the front.

Each set of latch parts includes a plate 52 secured to a housing-wall and having lugs 53 through which is movable longitudinally a bolt 54 extending outwardly thereof. The bolt has an eye 55 at one end, it has an abutment 56 between the lugs, and its other end is kept normally extended, with the abutment against one of the lugs, by a spring 57 interposed between the abutment and the other lug.

When a housing-cover is closed, it is locked by a pawl 58, which has a tapered or inclined toe 59 and a heel 60, and is mounted on a pin 61 carried by lugs 62 of a plate 63 secured to the under side of the cover, a spring 64 interposed between the plate and the heel tending to keep the pawl in engagement with the bolt and permitting the pawl to retract when sliding to locking engagement with the bolt while the cover is being closed.

In the case of a two-part cover, as shown by Figs. 10 and 11, the pawl of the latch may be omitted, and a bolt 54 is located with respect to each arm of a cover part so that the arm will be behind it when the cover is closed, and thus the cover is locked shut and subject to release upon withdrawal of the bolt.

Each bolt is connected at its eye with a rope 65, and the ropes of all bolts lead over pulleys 66 to a single draw member 67, located in any suitabe position in an aircraft, and to which they are connected. A cable 68 is connected with member 67 and to a lever 69 located within convenient reach of the pilot or other aircraft occupant. Another cable 70 is connected with member 67 and with an actuator controlled by an electric circuit comprising conductors 71, a battery 72 or other suitable source of current, and a switch 73 located within convenient reach of the pilot or other aircraft occupant. (See Fig. 2.)

The actuator (Fig. 5) comprises a cylinder 74, within which is a movable piston 75, connected with a rod 76, connected at its other end with cable 70. A spark-plug, near the end of the cylinder through which the rod 76 extends, is controlled by conductors 71; an opening, closed by a plug 78, is located in the same end, to permit the cylinder to be charged at one side of the piston, and in the space into which the ignition-points of the spark-plug extend, with powder or other suitable explosive. An exhaust-port 79 leads from the cylinder at the other side of the piston.

Operation

The positions of parts of the opener when closed is shown by Fig. 16. The parachute is held closed only by the locked covers against the opening effort of the opener-spring 32, and thus the parachute is inherently capable of initially expanding toward full open condition.

When the confining effort under which the parachute is held while in collapsed and housed condition is released by the unlocking of the covers, the spring 32 draws the member 31 away from the annular member 28, and through the links 30 and levers 29 the arms are swung outwardly to the open position disclosed by Figs. 4 and 17; by action on the cords 22 such opening of the envelope occurs as will enable it to entrap air as it emerges from the housing or other container, and then the parachute may continue its unfolding.

Ordinarily, the open diameter of the opener is less than that of the envelope, and while folded the free ends of the opener-arms lie against, or nearly against, the edge of the envelope with the cords 22 lying on the other side. Therefore, when the opener first is extended, as seen in Figs. 9 and 17, it restrains the envelope from assuming full open position, and thereafter it slides down on the cords to the place of circumferential coincidence of the cords and opener, as seen in Figs. 3 and 18.

Accordingly, the parachute, under the influence of entrapped air, gradually opens to the fully extended condition of the envelope, whereby excessive and sudden strain on the parachute, its rigging, and the airplane or other object to which it is connected is avoided.

When the parachutes associated with an aircraft are to be made available to effective action, that may be done quickly in an emergency either by closing the switch 73 or swinging the lever 69. Either the switch-controlled actuator or the lever, or both, may be installed in an aircraft. When an aircraft has both, the lever is available for use in case the actuator fails to function.

Upon the closing of the switch, the charge in the cylinder is exploded, the piston moved past the exhaust-port, and the cable 70 drawn against the member 67; and that member is moved similarly when the lever is swung. This movement results in pull on the ropes 65 and withdrawal of the bolts from the pawls 58, or/and the arms 43, and the unlocking of the covers.

With some installations, and particularly with those having light covers, the power of the parachute-opener spring 32 is sufficient, as soon as a compartment-cover is unlocked, to raise the free end of the cover enough for it to entrap air and quickly to be opened entirely by the air current. Therefore, with rear-hinged covers such as shown by Figs. 8 and 9, the push-open springs 41 may be omitted. Likewise, with light side-hinged cover parts, such as shown by Figs. 10 and 17, the springs 44 may be omitted, for the parachute-opener has sufficient extension power to swing the cover parts open.

As and after a parachute emerges from its compartment, the pull thereof gradually unwinds the load-rope 21 from the brake-retarded drum 47 until the rope entirely is payed out and stopped by its connection to the drum. Thus there is considerable restraint upon the progress of the parachute from its compartment to the full open and sustaining position and condition as shown by Fig. 3, and sudden and severe strains on the parachute and its rigging are avoided.

The retardation, by the parachute-opener, of the final opening movement of the envelope, as hereinbefore explained, also contributes, concurrently and cooperatively with the retarding action of the brake-restrained drum, to gradual imposition of resistance of the parachute to calling movement of the object to which it is connected.

Although the parachute of this invention is adapted particularly to be housed releasably in or on an aircraft with its load-rope connected thereto, it also readily can be associated similarly with, and load-rope connected to, a person or other object, with any suitable releasable means for holding the parts folded.

What I claim as new, and desire to secure by Letters Patent, is—

1. A parachute-opener comprising a central member, arms swingable thereon from and to folded position and connectable with parachute-envelope elements, a draw member connected with some of said arms, and a spring tending to move said draw member whereby to unfold said arms.

2. A parachute-opener comprising a central member, arms swingable thereon from and to folded position and connectable with parachute-envelope elements, a yoke on said central member, a draw member, links connecting said arms and draw member, and a spring connected with said yoke and draw member.

3. A parachute-opener comprising a central member, arms swingable thereon from and to folded position and connectable with parachute-envelope elements, levers on said arms, a draw member, links connecting said levers and draw member, a yoke on said central member, and a spring connected with said yoke and draw member.

4. In an aircraft having a plurality of parachute-compartments and covers therefor, latches locking said covers, ropes operable to release said latches and connected with a single draw member, a lever connected with said draw member, an actuator connected with said draw member, and control means for said actuator within reach of an aircraft occupant.

5. A parachute-opener comprising a central member, arms thereon swingable from and to folded position and connectable with parachute elements, a draw member connected with some of said arms, a spring tending to move said draw member whereby to unfold said arms, and a housing covering said draw member and spring.

6. A parachute-opened comprising a central member, arms swingable thereon from and to folded position and connectable with parachute elements, levers on said arms, a draw member, links connecting said levers and draw member, a yoke on said central member, a spring connected with said yoke and draw member, and a shield over said yoke housing said draw member and spring.

7. In an aircraft, the combination, with a plurality of parachute-compartments, covers therefor, latches locking said covers, and ropes operable to release said latches, of an actuator comprising a cylinder, a piston therein, a piston-rod on said piston arranged to be connected at its outer end with said ropes, an igniter for explosive placed at one side of said piston, and control means for said igniter within reach of an aircraft occupant.

In testimony whereof I affix my signature.
ELMER EIDEMILLER MOTTER.